(12) United States Patent
Drabbé

(10) Patent No.: US 12,564,892 B2
(45) Date of Patent: Mar. 3, 2026

(54) SYSTEM FOR COOLING A CUTTING WIRE

(71) Applicant: SMO bvba, Eeklo (BE)

(72) Inventor: Arne Drabbé, Eeklo (BE)

(73) Assignee: SMO bvba, Eeklo (BE)

( * ) Notice: Subject to any disclaimer, the term of this patent is extended or adjusted under 35 U.S.C. 154(b) by 474 days.

(21) Appl. No.: 18/181,896

(22) Filed: Mar. 10, 2023

(65) Prior Publication Data

US 2023/0286068 A1 Sep. 14, 2023

(30) Foreign Application Priority Data

Mar. 10, 2022 (BE) .................................. 2022/5163

(51) Int. Cl.
B23D 61/18 (2006.01)
B23D 57/00 (2006.01)
B28D 7/00 (2006.01)

(52) U.S. Cl.
CPC ....... B23D 61/185 (2013.01); B23D 57/0061 (2013.01); B28D 7/00 (2013.01)

(58) Field of Classification Search
CPC ...... B28D 5/0076; B28D 5/007; B28D 1/025; B24B 27/0633
See application file for complete search history.

(56) References Cited

U.S. PATENT DOCUMENTS

| | | | | |
|---|---|---|---|---|
| 5,201,305 A | * | 4/1993 | Takeuchi | B28D 5/045 |
| | | | | 125/16.02 |
| 5,827,113 A | * | 10/1998 | Okuno | B28D 5/0076 |
| | | | | 451/36 |
| 6,006,737 A | * | 12/1999 | Hayashi | B28D 5/045 |
| | | | | 125/16.02 |
| 6,234,159 B1 | | 5/2001 | Egglhuber | |
| 6,390,896 B1 | * | 5/2002 | Huber | B28D 5/0076 |
| | | | | 125/16.02 |
| 6,443,143 B1 | * | 9/2002 | Ishida | B28D 5/045 |
| | | | | 125/16.02 |
| 6,832,606 B2 | * | 12/2004 | Yamada | B28D 5/045 |
| | | | | 125/16.02 |
| 7,306,508 B2 | * | 12/2007 | Kawasaki | B28D 5/045 |
| | | | | 125/16.02 |
| 8,752,537 B2 | * | 6/2014 | Kim | B24B 27/0633 |
| | | | | 125/16.02 |
| 9,073,235 B2 | * | 7/2015 | Tagami | B28D 5/007 |

FOREIGN PATENT DOCUMENTS

| | | | | | | |
|---|---|---|---|---|---|---|
| EP | | 2759386 A1 | | 7/2014 | | |
| JP | | S61125768 A | * | 6/1986 | | |
| JP | | H0360964 A | * | 3/1991 | | |
| JP | | 2002036231 A | | 2/2002 | | |
| JP | | 2005329506 A | | 12/2005 | | |
| KR | | 101760383 B1 | * | 7/2017 | ............ | E04G 23/08 |
| KR | | 102057085 B | | 12/2019 | | |
| WO | WO-2008010353 A1 | * | 1/2008 | ............ | B28D 1/025 | |
| WO | | 2013156606 A1 | | 10/2013 | | |

* cited by examiner

*Primary Examiner* — Joel D Crandall
(74) *Attorney, Agent, or Firm* — Vorys, Sater, Seymour and Pease LLP

(57) ABSTRACT

Systems for cooling and directing a cutting wire. The systems include a water cooling box which permits cooling a cutting cable without any loss of cleaning/cooling fluid or contamination of the driving elements of the system. The systems also include a plurality of cutting wire directing elements which permit multiple cutting directions without derailing of the wire out of the guiding pulleys.

17 Claims, 3 Drawing Sheets

SYSTEM FOR COOLING A CUTTING WIRE

FIELD OF THE INVENTION

The present invention relates to a system for cooling cutting wire. In a second aspect, the present invention also relates to a method of operating the system. The present invention pertains to the technical field of sawing machines. In particular the present invention relates to the technical field of sawing machines using cutting wire.

BACKGROUND

Such a system according to the preamble is also known from JP2002036231, WO2013156606 (D2) and DE19739966 (D3). D1 further describes a guide pulley for a wire saw. D2 describes a machine for cutting stone blocks or the like wherein a cutting wire is used, which cable is further guided by a plurality of pulleys. D3 describes a wire saw for slicing shaped bodies from a workpiece. In particular, D3 describes a wire saw comprising a set of rollers parallel to each other and spaced above each other, cutting wire wound between rollers. The concepts in these documents are disadvantageously limited in that the pulley arrangements described therein can cope with a limited number of cutting directions.

EP0990498 (D4), JP2005329506 (D5) and KR102057085 (D6) disclose also systems according to the preamble. D4 discloses a sawing machine for brittle material. This saw uses a wire as a cutting element. In order to address the temperature build-up during the operation of the device, said device includes a cooling element positioned just before the cutting wire enters the object being cut. Such an arrangement results in the loss of the cooling fluid and spillage of cutting swarf and slurry. D5 presents a cutting makes use of a gas as a cooling medium. Also the device disclosed in D5 allows cooling medium to escape to the surrounding environment. D6 discloses a structural cutting device of nuclear power plant using dry method and adjustable cooling fluid supply. The device includes a cooling apparatus which sprays cooling medium upon the wire. Furthermore, the device includes driving means for the cutting wire provided in a vacuum chamber together with a flushing device, as a result of which the drive will be contaminated with the dust and/or slurry from the sawing.

The present invention aims to resolve at least some of the problems and disadvantages mentioned above. The aim of the invention is to provide a method which eliminates those disadvantages. The present invention targets at solving at least one of the aforementioned disadvantages.

SUMMARY OF THE INVENTION

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter Some embodiments of the present invention provide a cutting wire cooling box comprising: three sections separated by two divider elements; a first proximal opening for letting a cutting wire enter the first section and subsequently the second and third sections of the box; an air-wipe located at the end of the third and last section of the cooling box;

wherein, the box further includes a bottom mounted nozzle and a top mounted air outlet, the first section of the cooling box having a top mounted nozzle and a bottom mounted water outlet.

Other embodiments of the present invention provide methods of cyclically cooling and cleaning a cutting wire during a cutting operation comprising the steps of: a. receiving the cutting wire through into a first wire directing element; b. passing the cutting wire through an object to be cut by said cutting wire; c. passing the cutting wire through a second wire directing element; d. receiving the cutting wire in the water cooling box through the first opening; e. spraying the cutting wire with water sprayed through the top mounted nozzle; f. passing through the air-wiper and out of the water cooling box through the second opening of said water cooling box.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DESCRIPTION OF THE FIGURES

The following description of the figures of specific embodiments of the invention is merely exemplary in nature and is not intended to limit the present teachings, their application or uses. Throughout the drawings, corresponding reference numerals indicate like or corresponding parts and features.

DETAILED DESCRIPTION OF THE INVENTION

Figure 1:
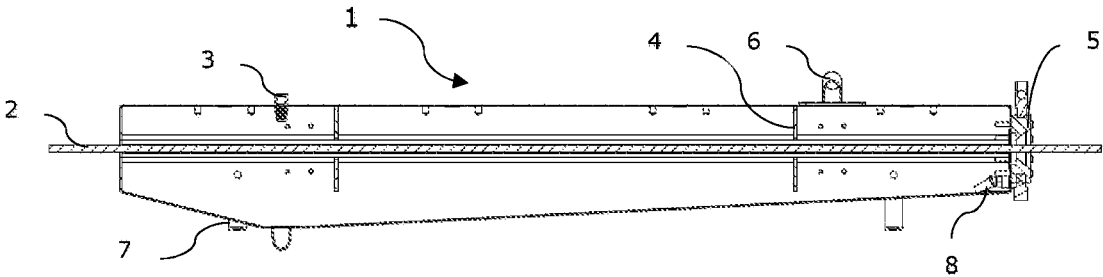
FIG. 1 shows a section view of a water cooling box.

The present invention concerns a cutting wire cooling box. The present invention advantageously enables cooling of the cutting wire with no spillage of cooling fluid. This allows for the device to be used in cutting operations requiring a higher level of safety such as, though not limited to, nuclear reactor decommissioning operations.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The recitation of numerical ranges by endpoints includes all numbers and fractions subsumed within that range, as well as the recited endpoints.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

wire water cooling box comprising:

three sections separated by two divider elements;

a first proximal opening for letting a cutting wire enter the first section and subsequently the second and third sections of the box;

air-wipe located at the end of the third and last section of the cooling box;

the box further includes a bottom mounted nozzle and a top mounted air outlet, the first section of the cooling box having a top mounted nozzle and a bottom mounted water outlet.

The water cooling box permits not only the cooling but also the cleaning of a cutting cable by relieving it of any cutting debris before said cable is dried and cleaned further by the air-wipe at the distal end of the cooling box. In this way the material and structural integrity of the cable is advantageously preserved while the debris clearance of the cable is re-established, thereby ensuring maximum cutting efficiency for a substantially longer period of time.

In a further embodiment, the water cooling box comprises at least one divider element extending from any internal side wall or internal top wall such that a gap between the lower edge of the divider and the bottom wall is maintained, said divider having a plate shape and hole in alignment with the first and second opening of the water cooling box. Such divider elements permit a free passage of the wire through the water cooling box while blocking any sludge or swarf from being blown back onto the wire by the air flow coming from the air-wiper.

In a further or another embodiment, the water cooling box comprises a top half and a bottom half. By preference, the top and bottom half of the water cooling box are connected by at least one hinge on one side of the water cooling box. Still more preferably, the top and bottom half of the water cooling box are connected by at least one latch on the side opposite to the side of the cable cutting box where the at least one hinge is installed. This advantageously permits installing the water cooling box around the wire without having to open the wire loop. Furthermore, the hinged construction of the water cooling box permits easier access to the interior of said box, making maintenance of the water cooling box significantly easier.

In a further or another embodiment, at least one of the ends of the box is equipped with a shroud for covering the cutting wire. In this way, any remaining sawing dust, swarf, sludge, or the like is advantageously contained. By preference, each shroud includes a plurality of telescoping sections. In this way, different lengths of wire can be covered. In an embodiment, at least one of the shrouds includes an inwards directed nozzle capable of injecting water, coolant, lubricant or at least one inert gas into said shroud. In this way, the range of operational conditions where the device can operate is advantageously extended. For example, when cutting through aluminum of magnesium elements, a flammable dust is produced, which dust must be prevented from igniting by creating an inert atmosphere inside the at least one shroud between the element being cut and the water cooling box.

In a second aspect, the invention provides a system for cooling and directing a cutting wire, said device comprising:

a. A cutting wire water cooling box according to the first aspect of the invention, the cooling box having a first opening at the proximal end of the box; a slanted bottom surface; a water outlet equipped with a filter for debris located on the lowest part of said slanted bottom surface; a top mounted nozzle directed towards the interior of the box; a bottom mounted water nozzle directed towards the bottom surface of the interior of the box; an air outlet on any top or sidewall of the box; and a second opening equipped with an annular air-wiper at the distal end of said box; and b. Two wire directing elements, each comprising a vertically movable bracket, a swiveling bracket rotatably attached to the vertically movable bracket and a wire orienting pulley rotatably attached to an axis extending horizontally from the swiveling bracket;

The system further comprises cutting wire, which cutting wire forms a loop passing between the two cable directing elements and through the water cooling box. This makes a continuous cutting and cooling cycle possible. In this way, the cable is always cooled before entering an object to be cut. Yet another advantage is the cleaning effect resulting from the wire passing through the water cooling box, contributing to reduce friction and excessive chip and/or dust loading of the cutting wire. The combination of the aforementioned advantageous effects compounds also into a significant reduction of heat build-up during a cutting operation. In tests carried out at the factory, cutting wires used in the present system exhibited a lifetime up to ten times longer than identical cables used in similar systems under identical circumstances. In the same tests, it was found that cutting speeds could be increased to at least three times a normal operating speed.

In a further embodiment, the vertically movable bracket having a first side comprising at least one linear guide and a threaded collar oriented in a substantially vertical direction. In this way, the wire directing element can travel along a vertical direction. This motion is made more stable and precise by the threaded collar. This advantageously permits placing the cutting wire very accurately on the object to be cut before and during cutting of the object to be cut.

In a further embodiment, the vertically movable bracket further comprising a second side opposite to the first side, which second side includes at least two parallel and substantially horizontal lugs extending from the surface of the first bracket, said lugs having a vertical axis. By preference, said axis is provided with roller and/or ball bearings. By preference, said bearings are sealed bearings. This advantageously permits a safe attachment of the swiveling bracket while permitting smooth rotation of said swiveling bracket. Said smooth rotation is advantageously maintained as any grit is kept out of the bearings by the seals on said bearings.

In a further embodiment, the horizontally extending axis of the swiveling bracket extends from a side plate, said side plate being rigidly attached to a trunnion, which trunnion is rotatably attached to the vertical axis of the lugs of the vertically movable bracket. By preference, the side plate of the swiveling bracket includes at least two horizontally oriented slots, which slots are configured to receive fasteners removably attachable to the trunnion. This advantageously permits adjusting the side plate of the swiveling bracket relative to the trunnion. This advantageously permits compensate for wear in the pulley, thereby maintaining good alignment between the pulley and the wire. By preference, the side plate of the swiveling bracket further includes a push bolt, which push bolt is oriented in the same direction as the longitudinal direction of the slots. This advantageously ensures the correct positioning of the side plate of the swiveling bracket relative to the trunnion. The push bolt permits also a more advantageous means to regulating the position of the side plate of the swiveling bracket as finer increments in said position are made possible by the threads of the push bolt.

In a further embodiment, the swiveling bracket is further equipped with a first sensor configured to detect rotation of the swiveling bracket about the vertical axis of the trunnion. By preference, the swiveling bracket is further equipped with an arm mounted on the side plate of said swiveling bracket, said arm having a distal end including a second sensor configured to measure the angle of the cutting wire relative to the arm. The control of the angle of attack on multiple planes advantageously permits early detection of situations that may result in undesired wear patterns or even breakage or destruction of the wire and/or other elements of the system.

In an embodiment, the system further comprises a water management element and a vacuum device, the water management element being in fluid connection with the top mounted nozzle of the water cooling box, the water management element being also in fluid connection with the bottom mounted water outlet of the water cooling box, the air outlet of the water cooling box is in further connection with a vacuum device. This allows the system to function independently of any external water sources, as the used water is filtered, recycled and reused.

A third aspect of the invention relates to a method of cyclically cooling and cleaning a cutting wire during a cutting operation comprising the steps of:
   a. receiving the cutting wire through into a first wire directing element;
   b. passing the cutting wire through an object to be cut by said cutting wire;
   c. passing the cutting wire through a second wire directing element;
   d. receiving the cutting wire in the water cooling box through the first opening;
   e. spraying the cutting wire with water sprayed through the top mounted nozzle;
   f. passing through the air-wiper and out of the water cooling box through the second opening of said water cooling box.

In a further embodiment, during operation of the system, water sprayed onto the cutting wire by the top mounted nozzle is drained into the water outlet. In this way the cutting wire is cooled and washed, while swarf and dust adhere to the sprayed water, which water is then captured. By preference, said water outlet includes a filter for any debris contained in the captured water. In this way, the captured water can be recirculated, advantageously permitting increased independence from external water sources.

In a further embodiment, during operation of the system, air introduced into the water cooling box by the air-wiper is extracted through the air outlet. By preference, air is removed through the available outlets at a rate which permits compensating the air introduced into the water cooling box by the air-wipe, and thereby, maintain a constant pressure inside the water cooling box. By preference, said pressure is lower than the pressure outside of the water cooling box. In this way, any particles and water droplets still adhering to the cutting wire after cooling are first displaced by the air-wiper towards the inside of the water cooling box and subsequently sucked through the air outlet. Since release of water and/or any debris to the outside of the water cooling box is eliminated, the cutting wire is dry as it exits the water cooling box. This permits operating the system in cutting operations with very high safety requirements such as, but not limited to, nuclear reactor decommissioning.

In a further embodiment, during operation of the system, water is introduced into the water cooling box by the bottom mounted water nozzle. This permits draining chips or other debris towards the water management system. By preference, introduction of water into the wire cooling box via the bottom water nozzle is carried out automatically and according to the recirculating water temperature. More preferably, the water management system includes means to measure the remaining amount of liquid water in the system and to transmit said measurements to a controller. In this way, the recirculating water is automatically refilled, thereby compensating for water losses due, for example, to evaporation. This has the further benefit of cooling the water still within the system, which further reduces losses due to evaporation.

The invention is further described by the following non-limiting examples which further illustrate the invention, and are not intended to, nor should they be interpreted to, limit the scope of the invention.

The present invention will be now described in more details, referring to examples that are not limitative.

With as a goal illustrating better the properties of the invention the following presents, as an example and limiting in no way other potential applications, a description of a number of preferred embodiments of the main elements of the system for cooling and directing a cutting wire.

FIG. 1 shows a section view of a water cooling box 1. In this figure, the water cooling box 1 is shown divided into three sections by two divider elements 4. A cutting wire 2 enters the water cooling box 1 through a first opening and into a first section, which section contains a top mounted nozzle 3 and a bottom mounted water outlet 7. The wire is shown traversing a second section and reaching a final third section where, before leaving said third section and the water cooling box 1, said wire passes through an air-wipe 5. The figure shows also a bottom mounted nozzle 8 and a top mounted air outlet 6.

Figure 2:
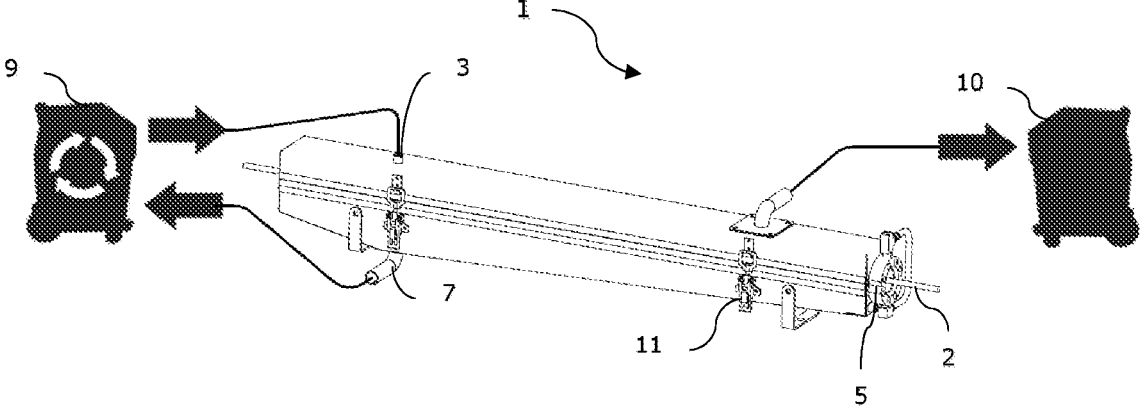
FIG. 2 shows the water cooling box connected a water management system and a vacuum device.

FIG. 2 shows the water cooling box 1 connected a water management element and 9 a vacuum device 10. The figure shows water proceeding from said water management element 9 and entering the water cooling box 1 through the top mounted nozzle 3. The same water management element 9 is shown receiving water from the water cooling box 1 via the bottom mounted water outlet 7, and in this way, forming a water recycling circuit. The water cooling box is shown in further connection with a vacuum device 10 by means of air outlet 6. The figure also shows a latch 11 by means of which the two hinged parts of the water cooling box 1 are kept closed.

Figure 3:
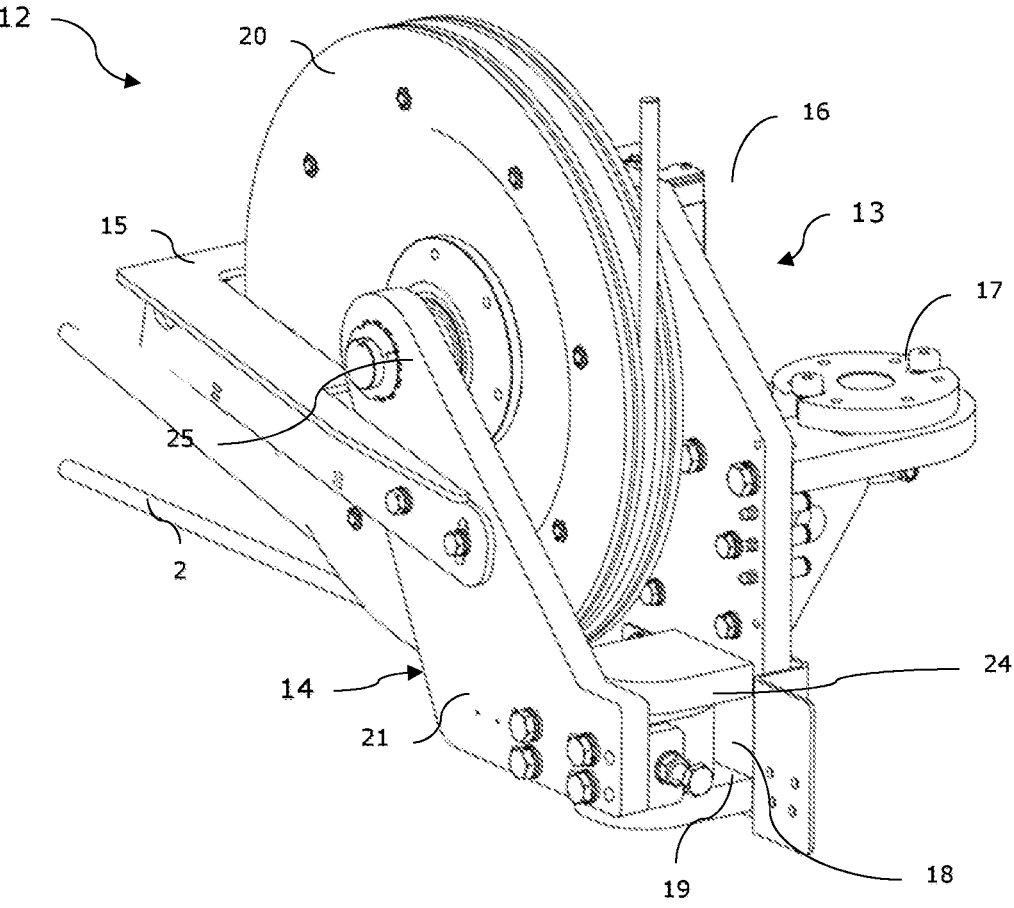
FIG. 3 shows an isometric view of a wire directing element.
Figure 4:
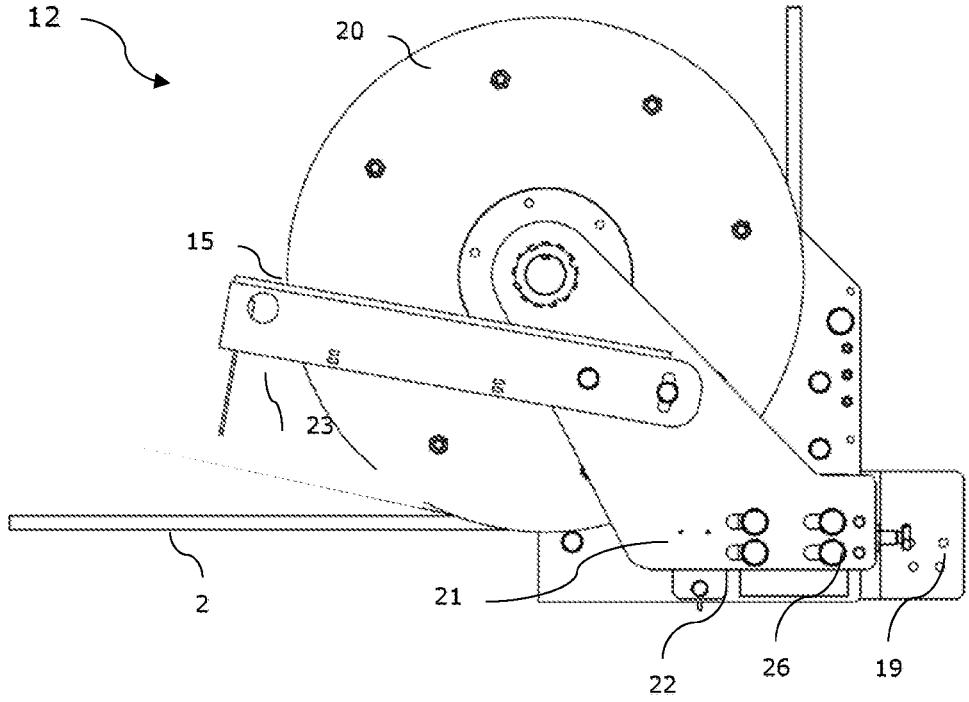
FIG. 4 shows a side view of a wire directing element.

FIG. 3 shows an isometric view of a wire directing element 12. This wire directing element 12 comprises three main assemblies, a vertically movable bracket 13, a swiveling bracket 14 and a pulley 20. The vertically movable bracket 13 is shown further comprising a linear guide 16 and a threaded collar 17 on one side and a pair of lugs 24 on the opposite side. The swiveling bracket 14 is shown comprising a side plate 21 equipped with a horizontal axis 25 supporting the pulley 20, said side plate 21 being further equipped with an arm 15 supporting a second sensor 23. The figure further shows the side plate 21 rigidly attached to a trunnion 18, which trunnion is rotatably attached to the lugs 24 of the vertically movable bracket 13. FIG. 4 shows a side view of the wire directing element. The figure shows the side plate 21 attached to the trunnion 18 by means of slots 26, which slots 26 combined with a push bolt 19, permit the adjustment of the position of the whole swiveling bracket 14 relative to the trunnion.

It is supposed that the present invention is not restricted to any form of realization described previously and that some modifications can be added to the presented example of fabrication without reappraisal of the appended claims. For example, the present invention has been described referring to abrasive coated wires, but it is clear that the invention can be applied to cutting chains for instance or to abrasive coated bead wire, etc.

The present invention is in no way limited to the embodiments described in the examples and/or shown in the figures. On the contrary, methods according to the present invention may be realized in many different ways without departing from the scope of the invention.

The invention claimed is:

1. A cutting wire water cooling box comprising:
three sections separated by two divider elements;
a first proximal opening for letting a cutting wire enter the first section and subsequently the second and third sections of the box;
air-wipe located at the end of the third section of the cooling box;

wherein the box further includes a bottom mounted nozzle and a top mounted air outlet, the first section of the cooling box having a top mounted nozzle and a bottom mounted water outlet.

2. The cutting wire water cooling box according to claim 1, wherein at least one of the two or more divider elements extends from an internal side wall or an internal top wall such that a gap between the lower edge of the at least one of the two or more dividers and the bottom wall is maintained, said at least one divider having a plate shape and a hole, the hole in alignment with the first proximal opening and a second distal opening of the wire cutting box.

3. The cutting wire water cooling box according to claim 1, wherein the water cooling box further comprises a top half and a bottom half.

4. The cutting wire water cooling box according to claim 3, wherein the top and bottom half of the water cooling box are connected by at least one hinge on one side of the water cooling box.

5. The cutting wire water cooling box according to claim 4, wherein the top and bottom half of the water cooling box are connected by at least one latch on the side opposite to the side of the cable cutting box where the at least one hinge is installed.

6. A system for cooling and directing a cutting wire, said device comprising:
a. a cutting wire water cooling box according to claim 1, the cooling box further including; a slanted bottom surface; a water outlet equipped with a filter for debris located on a lower portion of said slanted bottom surface; and a second opening equipped with an annular air-wiper at the distal end of said box; and
b. two wire directing elements, each comprising a vertically movable bracket, a swiveling bracket rotatably attached to the vertically movable bracket and a wire orienting pulley rotatably attached to an axis extending horizontally from the swiveling bracket;
wherein the system further comprises cutting wire, wherein the cutting wire forms a loop passing between the two cable directing elements and through the water cooling box.

7. The system for cooling and directing a cutting wire according to claim 6, the vertically movable bracket having a first side comprising at least one linear guide and a threaded collar oriented in a substantially vertical direction.

8. The system for cooling and directing a cutting wire according to claim 6, the vertically movable bracket further comprising a second side opposite to the first side, which second side includes at least two parallel and substantially horizontal lugs extending from the surface of the first bracket, said lugs having a vertical axis.

9. The system for cooling and directing a cutting wire according to claim 6, wherein the horizontally extending axis of the swiveling bracket extends from a side plate, said side plate being rigidly attached to a trunnion, which trunnion is rotatably attached to the vertical axis of the lugs of the vertically movable bracket.

10. The system for cooling and directing a cutting wire according to claim 6, wherein the side plate of the swiveling bracket includes at least two horizontally oriented slots, which slots are configured to receive fasteners removably attachable to the trunnion.

11. The system for cooling and directing a cutting wire according to claim 6, wherein the swiveling bracket is further equipped with a first sensor configured to detect rotation of the swiveling bracket about the vertical axis of the trunnion.

12. The system for cooling and directing a cutting wire according to claim 6, wherein the swiveling bracket is further equipped with an arm mounted on the side plate of said swiveling bracket, said arm having a distal end including a second sensor configured to measure the angle of the cutting wire relative to the arm.

13. The system for cooling and directing a cutting wire according to any claim 6, wherein the system further comprises a water management element and a vacuum device, the water management element being in fluid connection with the top mounted nozzle of the water cooling box, the water management element being also in fluid connection with the bottom mounted water outlet of the water cooling box, the air outlet of the water cooling box is connected with a vacuum device.

14. A method of cyclically cooling and cleaning a cutting wire during a cutting operation comprising the steps of:
  a. receiving the cutting wire through into a first wire directing element;
  b. passing the cutting wire through an object to be cut by said cutting wire;
  c. passing the cutting wire through a second wire directing element;
  d. receiving the cutting wire in the water cooling box through the first opening;
  e. spraying the cutting wire with water sprayed through the top mounted nozzle; and,
  f. passing through the air-wiper located at the distal end of the water cooling box and out of the water cooling box through the second opening of said water cooling box.

15. A method of cyclically cleaning and cooling a cutting wire during a cutting operation according to claim 14, wherein water sprayed onto the cutting wire by the top mounted nozzle is drained into a water outlet.

16. A method of cyclically cleaning and cooling a cutting wire during a cutting operation according to claim 14, wherein air introduced into the water cooling box by the air-wiper is extracted through an air outlet.

17. A method of cyclically cleaning and cooling a cutting wire during a cutting operation according to claim 14, wherein water is introduced into the water cooling box by a bottom mounted water nozzle.

\* \* \* \* \*